United States Patent [19]

Bethune et al.

[11] Patent Number: 5,275,705
[45] Date of Patent: Jan. 4, 1994

[54] PROCESS FOR MAKING FULLERENES

[75] Inventors: Donald S. Bethune, San Jose; Robert D. Johnson, Morgan Hill; Jesse R. Salem, Cupertino, all of Calif.

[73] Assignee: International Business Machines Corporation, Armonk, N.Y.

[21] Appl. No.: 987,939

[22] Filed: Dec. 9, 1992

[51] Int. Cl.$^5$ ............................................. C01B 31/00
[52] U.S. Cl. ................................. 204/173; 423/445 B
[58] Field of Search ...................... 373/8, 9, 60, 88, 97, 373/98, 89, 90, 93; 219/76.1, 76.13, 76.14, 72; 423/445; 204/157.47, 173

[56] References Cited

U.S. PATENT DOCUMENTS

| | | | |
|---|---|---|---|
| 5,172,278 | 12/1992 | Tutt | 359/885 |
| 5,227,038 | 7/1993 | Smalley et al. | 204/173 |
| 5,234,474 | 8/1993 | Whewell | 42/282 |
| 5,234,475 | 8/1993 | Malhotra et al. | 44/282 |

OTHER PUBLICATIONS

Diederich et al., *Science*, vol. 252, pp. 548–551 Apr. 26, 1991.
Lamb et al. *Science*, vol. 255, pp. 1413–1416, Mar. 13, 1992.
Shinohara et al. *Journ Phys Chem.*, vol. 95 (22) pp. 8449–8451 Oct. 31, 1991.
Hoinkis et al., "Multiple Species of La@$C_{82}$ and Y@$C_{82}$: Mass Spectroscopic and Solution EPR Studies," *Chemical Physics Letters*, vol. 98, p. 461, Oct. 16, 1992.
Stephens et al., "Structure of Single-Phase Superconducting $K_3C_{60}$", Nature, vol. 351, Jun. 20, 1991.
Sparn et al., "Pressure Dependence of Superconductivity in Single-Phase $K_cC_{60}$", Reports, Jun. 28, 1991.
Pickett, "Cagey Carbon Conundrums", Nature, vol. 351, Jun. 20, 1991.
Holczer et al., "Critical Magnetic Fields in the Superconducting State of $K_3C_{60}$", Physical Review Letters, vol. 67, No. 2, Jul. 8, 1991.
Parker et al., "High Yield Synthesis, Extraction and Mass Spectrometric Characterization of Fullereness $C_{60}$ to $C_{266}$", Journal of the American Chemical Society 113, 7499–7503 (Sep. 25, 1991).
Diederich et al., "Beyond $C_{60}$: The Higher Fullerenes", Acc. Chem. Res. 25, 119–126 Mar. 1992.
Holczer et al., "Alkali-Fulleride Superconductors: Synthesis, Composition, and Diamagnetic Shielding", Science, vol. 252 Reports May 24, 1991.
Rosseinsky et al., "Superconductivity at 28 K in $Rb_xC_{60}$", Physical Review Letters, vol. 66, No. 21, May 1991.
Haddon et al., "Conducting Films of $C_{60}$ and $C_{70}$ by Alkali-Metal Doping", Nature, vol. 350, Mar. 28, 1991.
Hebard et al., "Superconductivity at 18K in Potassium Doped Fullerene, $K_xC_{60}$", Nature 350, 600 (Apr. 18, 1991).
Kroto, "Space, Stars, $C_{60}$, and Soot", American Association for the Advancement of Science, Reprint Series, Nov. 25, 1988, vol. 242, pp. 1139–1145.
Haufler et al., "Efficient Production of $C_{60}$ (Buckminsterfullerene), $C_{60}H_{36}$, and the Solvated Buckide", J. Phys. Chem. 1990, 94, 8634–8636.
Curl et al., "Probing $C_{60}$", Articles, Nov. 18, 1988.
Bethune et al., "Method for Producing Intercalated Fullerene Carbon Clusters", IBM Technical Disclosure Bulletin, vol. 34, No. 4B Sep. 1991.
Kroto et al., "$C_{60}$: Buckminsterfullerene", Nature, vol. 318, Nov. 14, 1985.
Kratschmer et al., "Solid $C_{60}$: A New Form of Carbon", Nature, vol. 347, Sep. 27, 1990.
Bunshah et al., "Fullerene Formation in Sputtering and Electron Beam Evaporation Processes", Journal of Physical Chemistry, vol. 96, No. 17, Aug. 20, 1992.
Yannoni et al., "Scandium Clusters in Fullerene Cages", Science, vol. 256 May 22, 1992.
Wang, "Photoconductivity of Fullerene-Doped Polymers", Nature, vol. 356, Apr. 16, 1992.
Johnson et al., "Electron Paramagnetic Resonance Studies of Lanthanum-Containing $C_{82}$", Nature, vol. 355, Jan. 16, 1992.

*Primary Examiner*—Michael Lewis
*Assistant Examiner*—Stephen G. Kalinchak
*Attorney, Agent, or Firm*—Robert B. Martin

[57] ABSTRACT

The present invention relates to an improved process for making fullerenes having greater than seventy carbon atoms. The process involves electrical heating of a low density carbon rod in an inert atmosphere.

5 Claims, No Drawings

PROCESS FOR MAKING FULLERENES

FIELD OF THE INVENTION

The present invention relates to an improved process for making fullerenes having greater than seventy carbon atoms.

BACKGROUND OF THE INVENTION

In November of 1985, Kroto et al., (Nature 318, 162) disclosed the experimental evidence for the existence of a family of spherically shaped, carbon molecules which they dubbed "fullerenes". Since their discovery, there has been an extensive amount of research on this family of molecules and their uses such as superconductors, lubricants, chemical precursors, non-linear optical materials, diamond film seed layers and photosensitizers for refractive polymers.

Kroto et al. used laser beam vaporization of graphite to synthesize the fullerenes. Unfortunately, this method results in the formation of only small amounts of fullerene product.

In 1990, Kratschmer et al., Nature 347, 354 (1990) disclosed a method for the mass production of fullerenes involving resistive or arc heating of a dense graphite rod in an inert atmosphere. This method achieves a higher yield of the sixty carbon atom fullerenes. Diederich et al., "Beyond $C_{60}$: The Higher Fullerenes", Acc. Chem. Res. 25, 119 (1992) also discloses synthesizing fullerenes by resistive heating of a dense graphite rod. Diederich discloses that the yield of higher fullerenes having greater than seventy carbon atoms is relatively low. Such higher fullerenes are particularly important as diamond film seed layers. Parker et al., "High Yield Synthesis, Extraction and Mass Spectrometric Characterization of Fullerenes $C_{60}$ to $C_{266}$" JACS 113 7499 (1991) discloses organic extraction procedures for extracting a greater amount of higher fullerenes from the raw product formed by resistive heating of a dense graphite rod. However, while improved extraction procedures can increase the amount of recovery of higher fullerenes from the raw product, the amount of recovery is limited by the low yield of the higher fullerenes in the raw product.

Therefore, there still is a need in the art for a process which gives a higher yield of higher fullerenes having greater than seventy carbon atoms.

It is therefore an object of the present invention to provide an improved process for the production of higher fullerenes having greater than seventy carbon atoms.

Other objects and advantages will become apparent from the following disclosure.

SUMMARY OF THE INVENTION

The present invention relates to an improved process for making fullerenes comprising higher fullerenes having greater than seventy carbon atoms comprising the steps of:

(i) electrically heating a carbon article in an inert atmosphere to form solid carbon deposit comprising fullerenes, the article having a density less than about 1 gm/cm$^3$; and (ii) separating the fullerenes from the carbon deposit.

The carbon article used in the process of the present invention has a lower density than graphite which surprisingly results in a fullerene product comprising a larger amount of higher fullerenes having greater than seventy carbon atoms. Preferably, the carbon article comprises amorphous carbon and preferably, it has a density less than about 0.80 gm/cm$^3$.

A more thorough disclosure of the present invention is presented in the detailed description which follows.

DETAILED DESCRIPTION OF THE INVENTION

The present invention relates to an improved process for making higher fullerenes. Higher fullerenes as used herein shall mean fullerenes having greater than seventy carbon atoms. The first step of the process of the present invention involves electrically heating a carbon article in an inert atmosphere.

A suitable carbon article is an elongated carbon bar preferably in the shape of a rod having a generally rounded cross-section with a diameter of about 3 mm to about 7 mm. Preferably, the carbon article comprises amorphous carbon. However, the article can also comprise other forms of carbon such as graphite, activated or decolorizing carbon or mixtures thereof. The density of the carbon article is less than about 1 gm/cm$^3$, preferably less than about 0.80 gm/cm$^3$, more preferably less than about 0.70 gm/cm$^3$. The density of the carbon article can be varied by varying its composition. For example, to lower the density of the article, a greater proportion of amorphous carbon is used. Conversely, increasing the proportion of graphite powder will increase the density of the article. Preferably, the article comprises at least 50% of amorphous carbon and more preferably 100% amorphous carbon.

Carbon rods for use in the process of the present invention can conveniently be formed by mixing amorphous carbon powder and graphite with water and a binding agent such as dextrin to form a paste. The paste is then partially dried in a low temperature vacuum oven to obtain a paste having consistency of sticky, wet sand. The paste is then placed in rod shaped molds in a hydraulic press and compressed to a high pressure (e.g. about 5000 psi) for a short period of time of a few minutes to form the rods. The rods are then dried at an elevated temperature (e.g. 150° C.) and finally are fired in an inert atmosphere (e.g. nitrogen) at an elevated temperature (e.g. about 1400° to 1700° C.) for several hours (e.g. 2 hours.)

In an alternative embodiment, the paste can be admixed with the powder form of another element or compound such as powdered lanthana or yttria, $La_2O_3$ or $Y_2O_3$. The rods formed from such paste can be resistively heated to form fullerenes having the metal atom disposed inside the spherical fullerene. The carbon rods comprising such admixed powdered metal will generally have a slightly greater density than pure carbon rod proportional to the amount of the other element or compound in such rod.

To produce the fullerenes, the carbon rod is then electrically heated in an inert atmosphere. Electrically heating includes both electrical resistive heating and arc heating. Preferably, the carbon rod is arc heated. Conveniently, a high electrical potential (generally about 15 to 25 volts with current of about 90 amps) is established between the rod as a first electrode and a second electrode such as a graphite disk, rod or plate to resistively heat the carbon rod to a high temperature (e.g. about 2800° C. or greater). Suitably, the rod is heated in a chamber which is partially evacuated and contains an inert atmosphere. Suitably the rod is heated in an atmosphere of helium, argon or neon preferably at a pressure of about 100 torr to 250 torr, more preferably about 150 torr. The rod is vaporized at a rate of about 2 to 10 mm/min. The arc heating of the rod results in the formation of a carbon vapor which condenses in the chamber as a solid product and is readily recovered.

The second step of the process of the present invention involves separating the fullerenes from the solid carbon product. Conveniently, fullerene product (including $C_{60}$ and $C_{70}$ fullerenes and higher fullerenes) can be readily separated from the carbon deposit by extraction with a suitable organic solvent. Suitable solvents include toluene, benzene, carbon disulfide or tetramethyl benzene ("TMB"). Carbon disulfide and TMB will generally preferentially extract a larger amount of the higher fullerenes from the carbon deposit. Optionally, the higher fullerenes having greater than seventy atoms can be separated from $C_{60-70}$ fullerenes by standard organic separation techniques such as liquid chromatographic techniques.

The preferred products of the process of the present invention are fullerenes having 76, 78, 84, 90 and 96 carbon atoms. The process of the present invention results in formation of a greater proportion of higher fullerene in the fullerene product. Generally, about 10% of the toluene soluble fullerene product is higher fullerenes.

The following examples are detailed descriptions of the process of the present invention. The detailed description fall within the scope of, and serve to exemplify, the more generally described processes set forth above. The examples are presented for illustrative purposes only, and are not intended as a restriction on the scope of the invention. All temperatures are in degrees Celsius.

EXAMPLE I

Fabricating a Low Density Carbon Rod 10 gms of amorphous carbon powder was mixed with 5 gms of dextrin syrup and a slight amount of water and made into a paste. Excess water was removed in a low temperature vacuum drying oven, until a paste the consistency of sticky, slightly wet sand was obtained.

Rods were formed by pressing the material in a hydraulic press to pressure of ~5000 psi for about one minute.

The rods were further dried in a 150° C. oven in air. The rods were then fired at 1400 C. under an inert atmosphere of nitrogen for several hours. The resulting rod had a density of 0.7 gm/cm$^3$.

EXAMPLE II

Production of Fullerenes

The rod of Example I was compared to a commercially available rod having a density of 1.9 gm/cm$^3$ (Carbone of America—rod 6.22 mm in dia grade 47/spk spectroscopic).

Each rod was mounted in an electrode holder in a water cooled vacuum chamber which was evacuated, flushed several times with helium, and then backfilled with 200 Torr of helium. With the rod used as the positive electrode, an arc was struck between the rod and a normal graphite counter-electrode.

A current of 90 amps was used to vaporize the rod, while maintaining a small gap (1-3 mm) between the rod and the counter-electrode. The heating of the rod resulted in the production of a solid carbon deposit in the chamber. The carbon deposit was removed from the chamber, placed in a Soxhlet extractor, and fullerenes were extracted with toluene.

The toluene extract solution was slurried with neutral alumina, dried and loaded on top of an alumina column. The fullerenes were eluded chromatographically with hexanes mixed with increasing amounts of toluene. Three factions were obtained and the composition of each fraction determined by mass spectroscopy and high pressure liquid chromatography. The results were as follows: the first fraction >95% $C_{60}$; the second fraction >80% $C_{70}$, and the third fraction >60% $C_{n>70}$. The weight proportions of these fractions were as follows:

| Rod | Density | Weight % of Fraction 1  2  3 |
|---|---|---|
| A. | 0.7 gm/cm$^3$ | 61:20:19 |
| B. | 1.9 gm/cm$^3$ | 73:25:2 |

Although this invention has been described with respect to specific embodiments, the details thereof are not to be construed as limitations for it will be apparent that various embodiments, changes and modifications may be resorted to without departing from the spirit and scope thereof, and it is understood that such equivalent embodiments are intended to be included within the scope of this invention.

We claim:

1. An process for making fullerenes comprising higher fullerenes having greater than seventy carbon atoms comprising the steps of:
    (i) electrically heating a carbon article in an inert atmosphere to form a carbon product containing the fullerenes, said article having a density less than 0.7 gm/cm$^3$; and
    (ii) separating the fullerenes from said product.

2. The process of claim 1 wherein said carbon article comprises amorphous carbon.

3. The process of claim 2 wherein said carbon article is a carbon rod.

4. The process of claim 2 wherein the carbon article is electrically heated by arc heating.

5. The process of claim 2 wherein said fullerenes are separated from the carbon product by organic liquid extraction.

* * * * *